United States Patent [19]

Fonda-Bonardi

[11] Patent Number: 5,523,176
[45] Date of Patent: Jun. 4, 1996

[54] APPARATUS FOR GENERATING ELECTRICITY

[76] Inventor: G. Fonda-Bonardi, 2075 Linda Flora Dr. L, Los Angeles, Calif. 90077

[21] Appl. No.: 262,159

[22] Filed: Jun. 17, 1994

[51] Int. Cl.⁶ .................................................. H01M 8/04
[52] U.S. Cl. .................................................. 429/34
[58] Field of Search .................................................. 429/34

[56] References Cited

U.S. PATENT DOCUMENTS 4,362,789  12/1982  Dighe .................................. 429/34 X
5,413,879  5/1995  Domeracki et al. .................... 429/34 X

*Primary Examiner*—John S. Maples
*Attorney, Agent, or Firm*—J. E. Brunton

[57] ABSTRACT

An apparatus for generating electric current which includes an integrated system comprising a fuel cell which is interconnected with two or more turbocompressors in a manner so as to increase the pressure of atmospheric oxygen fed to a fuel cell by utilizing the potential energy of the exhaust of the fuel cell as well as the potential energy of a source of fuel under pressure.

21 Claims, 3 Drawing Sheets

APPARATUS FOR GENERATING ELECTRICITY

BACKGROUND OF THE INVENTION

1. Field of the Invention

The present invention relates generally to apparatus for generating electric current. More particularly, the invention concerns an integrated system comprising a fuel cell which is interconnected with a pair of turbocompressors in a manner so as to increase the pressure of atmospheric oxygen fed to a fuel cell by utilizing the potential energy of the exhaust of the fuel cell as well as the potential energy of a source of fuel under pressure.

2. Discussion of the Invention

A fuel cell is a device in which the energy released in the oxidation of a conventional fuel is made directly available in the form of an electric current. Although the principle of the fuel cell was formulated as long ago as 1894, it is only in recent years that reasonably efficient fuel cells have been constructed and put to practical use for generating electricity in many applications, including vehicular propulsion.

Typically the fuel cell operates by bringing together a fuel gas, as for example hydrogen, and oxygen, typically taken from the atmosphere. Generally the hydrogen fuel is bottled under high pressure, liquefied, or chemically bound. The reactants are combined in a vessel under some convenient combination of pressure and temperature, for example, 10 to 40 pounds per square inch gauge and 220 degrees Fahrenheit. The so called Proton Exchange Membrane (PEM) fuel cell represents a typical prior art fuel cell usable in the apparatus of the invention, but the invention is not limited to the use of this type of cell.

A typical PEM fuel cell operates by combining oxygen and hydrogen across a membrane while developing an electromotive potential between two electrodes placed on either side of the membrane. The process also releases heat which increases the temperature of the reacting fluids and tends to vaporize the newly formed water.

Although the oxygen could be supplied in pure molecular form (this is done for some applications, e.g. space and submarine), earthbound fuel cells use atmospheric air as the source of the oxygen, which is pumped into the fuel cell together with the nitrogen, carbon dioxide, argon, moisture and any other trace gases present in the air. The excess water formed in the cell reaction is generally removed as water vapor entrained in the exhaust of the non-reacting nitrogen, carbon dioxide, etc. from the fuel cell back to the atmosphere.

In practice the removal of the water in the form of saturated vapor requires a volume of entraining gas larger than the volume containing the stoichiometric quantity of oxygen reacted to form the water to be removed. Typically, complete removal of the water requires a volume of air approximately 1.5 times larger than stoichiometric. This imbalance has the consequence that the exhaust gas also contains a percentage of unreacted oxygen. Assuming that atmospheric air contains, in round numbers, 80% nitrogen and 20% oxygen (and neglecting for simplicity the minor constituents) the reaction:

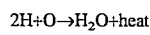

or indicating complete molecules,

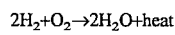

becomes

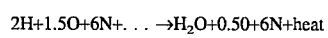

or indicating complete molecules,

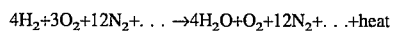

The enthalpy of the exhaust gas is available for use in a turbine, which can operate with a typical efficiency of 85–90% when built in accordance with the state of the art for the dimensions and RPM appropriate to the applications.

The power developed by the turbine is coupled to a centrifugal compressor matched to the turbine RPM through a shaft comprising a gas bearing as illustrated for example in FIG. 7 of U.S. Pat. No. 4,808,070, which issued to the present inventor. Since the efficiency of the state-of-the art centrifugal compressor is typically 70–75%, the power developed in the turbine may not be sufficient (depending on the temperature of the exhaust flow) to compress the air to the desired pressure. In any event, a single-stage centrifugal compressor has a practical limit of about 1.8:1 for the ratio of absolute pressure of the discharge over the inlet, or 12 psig. discharge for an atmospheric inlet. If the desired operating pressure of the fuel cell is higher than this, two or more stages will be required, and the upper stages can be driven by expanding hydrogen through turbines rather than through a regulator valve. For simplicity a two-stage system is discussed hereafter.

As a general rule, in operating a fuel cell of conventional construction, the pressure of the hydrogen must be lowered from that existing in the storage bottle, while the pressure of the oxygen taken from atmosphere must be increased above atmospheric pressure. In prior art devices, these pressure changes are accomplished by means of a regulator valve, in the case of the hydrogen, and by a compressor, in the case of the oxygen. Generally, in operating the prior art fuel cell, the power needed to run the compressor is taken from the electrical output of the fuel cell and can constitute a substantial fraction thereof. In addition, the compressor used in prior art applications requires lubrication which is typically supplied by various types of lubricating means. The lubricating means generally increases the complexity, weight and cost of the operating system and offers a finite possibility of undesirable contamination of the fuel cell with lubricants.

In carefully analyzing fuel cell operation it became apparent to the present inventor that there are at least two sources of energy that can be used to directly drive a compressor. One such source is the potential energy of the exhaust gas expanding from the fuel cell operating pressure to atmospheric pressure. Another source of energy is the potential energy of the compressed hydrogen expanding from the reservoir to the fuel cell itself. In typical prior art system, this latter source of energy is dissipated by dropping the pressure through one or more regulating valves. However, as will be better understood from the discussion which follows, this energy can be beneficially recovered by expanding the hydrogen through one or more turbines which are directly connected to one or more centrifugal compressors. It is this novel feature which comprises an important aspect of the apparatus of the present invention. More particularly, a significant contribution to the present invention was the realization by the present inventor that part of the pressurized hydrogen normally used as the fuel source effectively could be exploited to drive a turbine and the energy thus derived could be used to drive a centrifugal compressor which, in turn, could function to increase the pressure of the oxygen taken from atmosphere and supplied to the fuel cell.

Another important aspect of the present invention involves the use in the apparatus of the invention of a novel gas bearing turbine of the character described in U.S. Pat. No. 4,808,070 issued to the present inventor. Use of this highly novel, non-lubricated fluid bearing turbine not only provides the high operating efficiency required in the present application, but also elegantly solves the contamination problem encountered as a result of the use of conventional lubricated turbines.

SUMMARY OF THE INVENTION

It is an object of the present invention to provide an integrated electrical power generating system which uses, in conjunction with a fuel cell, two or more turbocompressors that function to controllably increase the pressure of atmospheric oxygen fed to a fuel cell by utilizing the potential energy of the exhaust of the fuel cell augmented by the potential energy of the pressurized hydrogen which is used as the fuel source.

Another object of the invention is to eliminate the need for a lubricated turbocompressor by using a gas bearing as disclosed in U.S. Pat. No. 4,808,070 to provide the interconnection of an expansion turbine with the corresponding stage of a centrifugal compressor.

Still another object of the invention is to provide an integrated system of the character described which embodies a fuel cell, turbine, bearing, and compressor which are interconnected together in a small, self-contained package.

A further object of the invention is to prevent lubrication contamination the fuel cell caused by coupling the fuel cell with a turbine.

DESCRIPTION OF THE INVENTION

Figure 1:
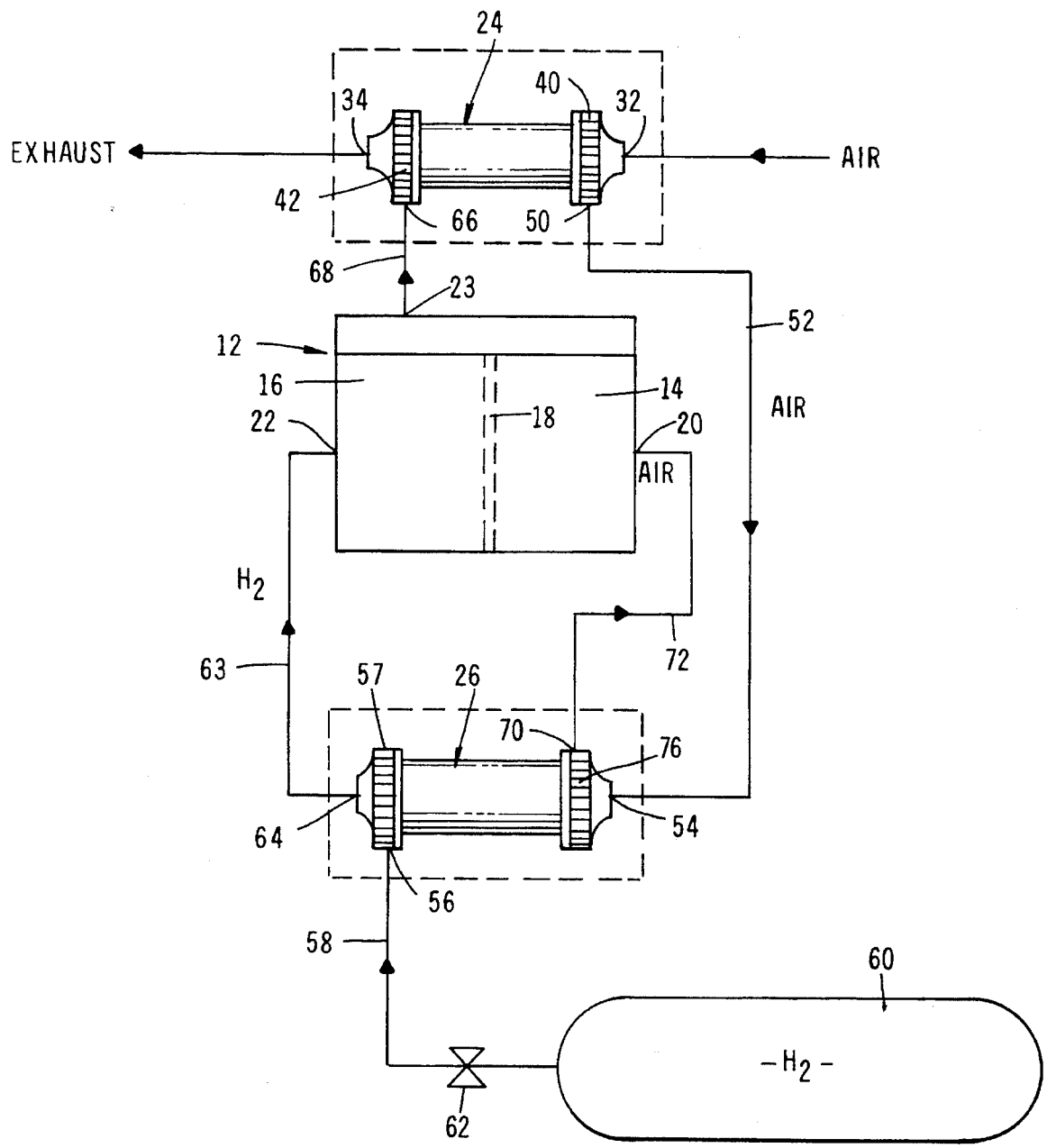
FIG. 1 is a generally diagrammatic view of one form of the apparatus of the invention showing the interconnections among the fuel cell, the turbocompressor units, and the hydrogen reservoir.

Referring to the drawings and particularly FIG. 1, one form of the electrical current generating apparatus of the present invention is there illustrated and comprises a conventional fuel cell of the proton-exchange membrane character. The construction and operation of this type of fuel cell is well known to those skilled in the art and will not be discussed in detail herein. Such fuel cells comprise a housing 12 having first and second chambers 14 and 16 and a membrane 18 disposed intermediate first and second chambers 14 and 16 and an exhaust gas outlet 23. First chamber 14 is provided with an air inlet 20 while second chamber 16 is provided with a hydrogen inlet 22.

Figure 2:
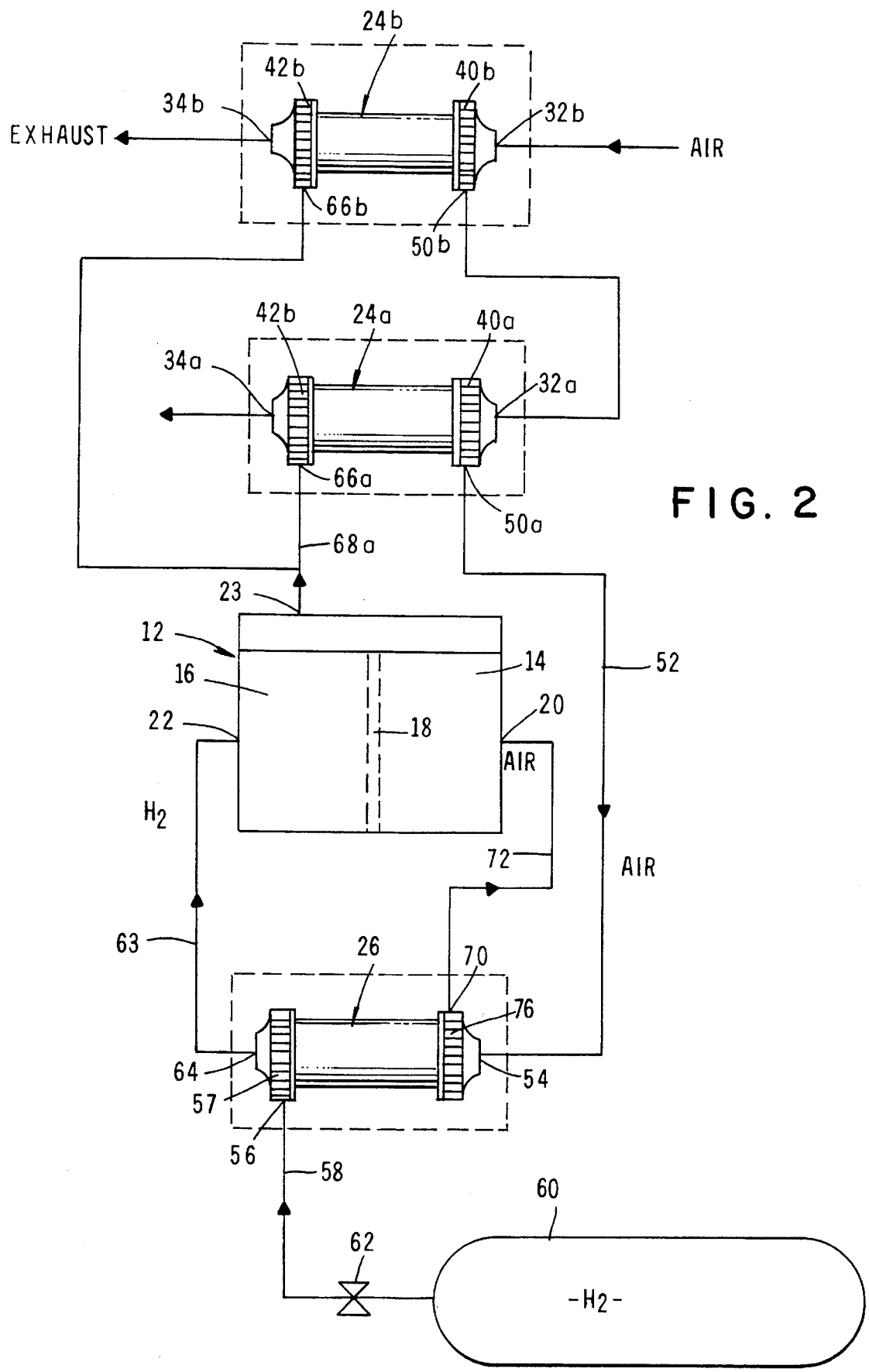
FIG. 2 is a generally diagrammatic view of another form of the apparatus of the invention showing the interconnections of the various elements of the appartus in the case of a series-parallel combination of turbo-compressor units.

In a manner presently to be described in detail, a pair of turbocompressor units 24 and 26 are operably interconnected with the fuel cell. More particularly, in the form of the invention shown in FIGS. 1 and 2, a first drive means, which forms a part of turbocompressor 24, is connected to exhaust gas outlet 23 of second chamber 16 and is driven by the exhaust gases flowing therefrom.

A first gas compressor means, which also forms a part of turbocompressor 24, is drivably interconnected with first drive means, for compressing gas derived from atmosphere.

A second gas compressor means, which forms a part of second turbocompressor 26, has an inlet in communication with an outlet of the first gas compressor means and an outlet in communication with the inlet of first chamber 14 of housing 12 of the fuel cell.

A second drive means, which forms a part of turbocompressor 26, is drivably interconnected with a second gas compressor means for driving the second gas compressor means.

As shown in FIG. 1, the second drive means has a gas outlet 64 in communication with inlet 22 of second chamber 16 of the fuel cell.

A fuel supply means, shown here as a hydrogen reservoir, has an outlet in communication with the inlet of the second drive means for driving the drive means.

Figure 3:
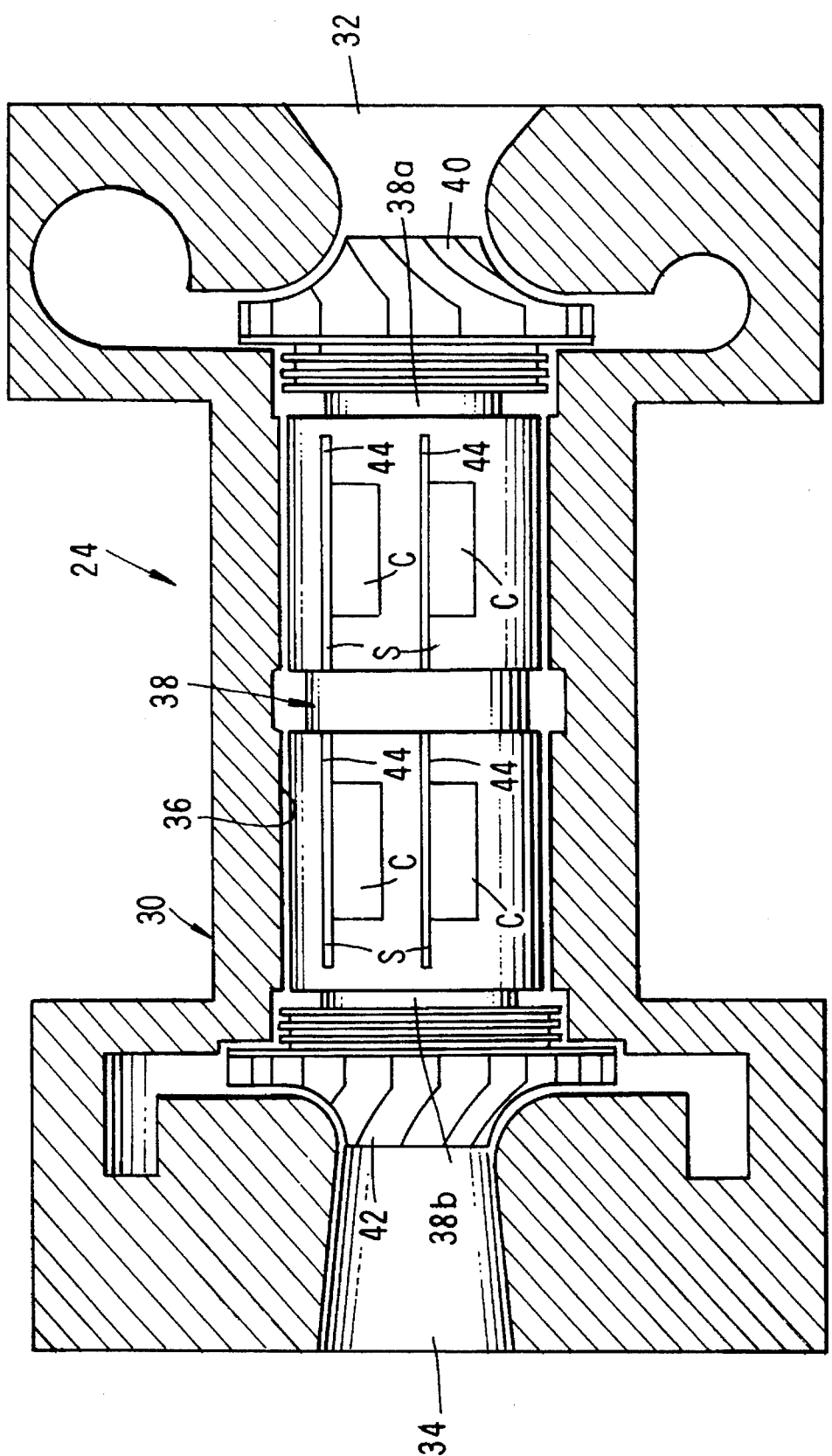
FIG. 3 is an enlarged, cross-sectional view of one of the turbocompressor units shown in FIGS. 1 and 2.

As best seen by now referring to FIG. 3, turbocompressor 24 comprises a support housing 30 having an inlet port 32 and an outlet port 34. An internal bore 36 extends longitudinally of housing 30 and defines a smooth inner surface. Rotatable within bore 36 is a shaft 38 having first and second ends 38*a* and 38*b*. Connected to shaft 38 proximate end 38*a* is a compressor wheel 40 which forms a part of the first gas compressor means of the invention. Connected to shaft 38 proximate opposite end 38*b* is a turbine wheel 42 which forms a part of the first drive means of the invention. As shown in FIG. 3, compressor wheel 40 is disposed proximate inlet port 32 while turbine wheel 42 is disposed proximate outlet port 34.

It is to be understood that turbocompressor 26 is of identical construction to turbocompressor 24 and is of the configuration shown in FIG. 3. Reference to U.S. Pat. No. 4,808,070 issued to G. Fonda-Bonardi describes in greater detail the construction and operation of the turbocompressor shown in FIG. 2. U.S. Pat. No. 4,808,070 is incorporated herein by reference as though fully set forth herein, and reference should be made to this patent for additional details concerning the nature and operation of the gas bearing portions of turbocompressors 24 and 26.

As more fully described in U.S. Pat. No. 4,808,070, bore 36 is generally circular in cross section at any point and is of a predetermined diameter. The inner surface of the bore is preferably generally smooth and uninterrupted. Shaft 38 is of a predetermined diameter less than the diameter of bore 36 and defines an elongated outer surface. Formed in the outer surface of the shaft are a plurality of circumferentially spaced, longitudinally extending recesses or cavities "C" of a pre-determined depth. Each cavity "C" defines along one margin thereof a radially, outwardly extending step "S" of a pre-determined height (see also U.S. Pat. No. 4,808,070, FIG. 3).

Also formed in shaft 38 are a plurality of circumferentially spaced, longitudinally extending grooves or channels 44, the purpose of which is discussed in detail in U.S. Pat. No. 4,808,070. As discussed in this patent, as shaft 38 rotates, gas will be drawn into the space between the inner walls of the cylindrical bore and the outer surfaces of the shaft and will function to maintain precise concentricity of the shaft within the bore 36. As previously mentioned herein, the use of this novel gas bearing arrangement, not only provides the efficiency necessary to the optimum operation of the apparatus of the invention, but also elegantly removes any possibility of contaminating the fuel cells, since the turbocompressor construction shown in FIG. 3 requires the use of no lubricants.

Turning once again to FIG. 1, it is to be noted that the first gas compressor means portion of turbocompressor assembly 24 has an outlet port 50 which is appropriately interconnected as by a conduit 52 with an inlet port 54 of the second gas compressor means portion turbocompressor assembly 26. Turbocompressor assembly 26 also is provided with an inlet port 56 which is disposed proximate a turbine wheel 58. Operably interconnected with inlet 56 by means of a conduit 58 is a fuel supply means shown here as a bottle or reservoir 60 containing hydrogen under pressure. A suitable valve 62 is disposed in conduit 58 to control the flow of hydrogen under pressure toward inlet 56 of second drive means portion of turbocompressor assembly 26. An exhaust outlet 64 of the second drive means portion of turbocompressor 26 is interconnected with inlet 22 of chamber 16 of the fuel cell by means of an appropriate conduit 64.

As best seen by referring to the upper portion of FIG. 1, outlet 23 of second housing 12 of the fuel cell is connected with an inlet 66 provided on the first drive means portion of turbocompressor assembly 24 proximate turbine wheel 42 by means of a conduit 68. Similarly, as seen by referring to the central portion of FIG. 1, inlet 20 of chamber 14 of the fuel cell is interconnected with an outlet 70 provided on the second gas compressor means portion of turbocompressor 26 by means of a conduit 72.

With the construction thus described and as illustrated in FIG. 1, when the fuel cell is in operation, exhaust gases flowing through outlet 23 from housing 12 of the fuel cell will drive the turbine wheel 42 of the first drive means which will, in turn, drive the compressor wheel 40 of the first gas compressor means. This will cause air from atmosphere to be drawn into inlet port 32 and forced outwardly through outlet 50 toward inlet port 54 of the second gas compressor means portion of turbocompressor 26 via conduit 52. At the same time, hydrogen gas being expelled from reservoir 60 will flow into the second drive means portion of turbocompressor unit 26 via valve 62 and conduit 58 and will drive turbine wheel 58. Rotation of turbine wheel 58 will cause concomitant rotation of a compressor wheel 76 which is mounted for rotation with the shaft of turbocompressor 26. This rotation of compressor wheel 76 will further pressurize the air flowing into inlet port 58 and will exhaust the pressurized air toward chamber 14 of the fuel cell via conduit 72 and inlet 20 of chamber 14 of the fuel cell.

In case the pressure developed by the compressor wheel 40 of the first compressor means, as augmented by the pressure developed by wheel 76 of the second compressor, is still below the pressure desired for the operation of the cell, but the net energy available from the expansion of the exhaust gases flowing through outlet 23 and delivered to the turbine wheel 42 of the first turbocompressor is in fact sufficient, if fully utilized, to compress the air to the desired pressure, then first turbocompressor 24 may be subdivided in two or more subunits, wherein the turbine means of all subunits are connected in parallel, but the compressor means of the subunits are connected in series. This is more specifically illustrated in FIG. 2, where all reference numbers have the same meaning as in FIG. 1, except those pertaining to the subunits, which are differentiated by appending letters "a" and respectively "b" to the reference numbers.

It should be noted that intercoolers (not shown) may be profitably inserted between turbocompressor 24a and turbocompressor 24b for the purpose of increasing the overall efficiency of the system, as is well known in the art.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:
1. An electrical current generating apparatus, comprising:
   (a) a fuel cell including:
      (i) a housing having first and second chambers, and an exhaust gas outlet, said first chamber having an inlet and said second chamber having an inlet; and
      (ii) a membrane disposed intermediate said first and second chambers;
   (b) first drive means connected to said exhaust gas outlet of said housing, and driven by the exhaust gases flowing therefrom, for driving a first gas compressor means;
   (c) said first gas compressor means drivably interconnected with said first drive means, for compressing gas derived from atmosphere, said first gas compressor means having an outlet;
   (d) a second gas compressor means having an inlet in communication with said outlet of said first gas compressor means and an outlet in communication with said inlet of said first chamber of said housing of said fuel cell;
   (e) a second drive means drivably interconnected with said second gas compressor means for driving said second gas compressor means, said second drive means having a gas inlet and a gas outlet in communication with said inlet of said second chamber of said fuel cell;
   (f) fuel supply means having an outlet in communication with said inlet of said second drive means for driving said second drive means.

2. An apparatus as defined in claim 1 in which said first and second drive means comprise first and second gas turbines respectively.

3. An apparatus as defined in claim 2 further including support means for supporting said second gas compressor means and said second gas turbine, said support means including a gas bearing.

4. An apparatus as defined in claim 3 in which said second gas compressor means and said second gas turbine are connected by a shaft, said shaft being rotatably supported by a gas bearing.

5. An apparatus as defined in claim 4 in which said shaft includes:
   (a) a plurality of circumferentially spaced, longitudinally extending recesses, each said recess defining an elongated, generally radially outwardly extending step; and
   (b) a plurality of circumferentially spaced, longitudinally extending grooves disposed proximate said steps, and grooves including an end portion extending beyond one of said longitudinally spaced faces of said support.

6. An apparatus as defined in claim 5 further including support means for supporting said first gas compressor means and said first gas turbine, said support means including bearing means.

7. An apparatus as defined in claim 6 in which said first gas compressor means and said first gas turbine are connected by a shaft, said shaft being rotatably supported by said bearing means.

8. An apparatus as defined in claim 7 in which said bearing means comprises a gas bearing.

9. An electrical current generating apparatus, comprising:
   (a) a fuel cell including:
      (i) a housing having first and second chambers, and an outlet, said first chamber having an inlet and said second chamber having an inlet; and (ii) a membrane disposed intermediate said first and second chambers;

(b) a first gas compressor means having a gas inlet and a gas outlet for compressing gas introduced into said gas inlet;

(c) a second gas compressor means having a second gas inlet and a second gas outlet for compressing gas introduced into said second gas inlet, said second gas inlet being in communication with said gas outlet of said first gas compressor means and said second gas outlet being in communication with said inlet of said first chamber of said housing of said fuel cell;

(d) a first gas turbine drivably interconnected with said first gas compressor means, said first gas turbine having a gas inlet in communication with said outlet of said housing of said fuel cell and a gas outlet;

(e) a second gas turbine drivably interconnected with said second gas compressor means, said second gas turbine having a gas inlet and a gas outlet in communication with said second chamber of said housing of said fuel cell; and (f) a source of gaseous fuel under pressure having an outlet in communication with said gas inlet of said second gas turbine.

10. An apparatus as defined in claim 9 further including support means for supporting said second gas compressor means and said second gas turbine, said support means including a gas bearing.

11. An apparatus as defined in claim 10 in which said second gas compressor means and said second gas turbine are connected by a shaft, said shaft being rotatably supported by a gas bearing.

12. An apparatus as defined in claim 11 in which said shaft includes:

(a) a plurality of circumferentially spaced, longitudinally extending recesses, each said recess defining an elongated, generally radially outwardly extending step; and (b) a plurality of circumferentially spaced, longitudinally extending grooves disposed proximate said steps, and grooves including an end portion extending beyond one of said longitudinally spaced faces of said support.

13. An apparatus as defined in claim 12 further including support means for supporting said first gas compressor means and said first gas turbine, said support means including bearing means.

14. An electrical current generating apparatus comprising:

(a) a fuel cell including:
(i) a housing having first and second chambers and an outlet, said first chamber having an inlet and said second chamber having an inlet; and
(ii) a membrane disposed intermediate said first and second chambers;

(b) a first turbocompressor, operably associated with said fuel cell, including a support housing having an outlet port, an inlet port in communication with said outlet of said housing of said fuel cell, a bore defining an inner surface, a shaft rotatable within said bore, a compressor wheel connected to said shaft proximate said inlet port and a turbine wheel connected to said shaft proximate said outlet port;

(c) a second turbocompressor operably associated with said fuel cell, including a support housing having an inlet port in communication with said outlet of said first turbocompressor, an outlet port in communication with said inlet port of said second chamber of said fuel cell, a bore defining an inner surface, a shaft rotatable within said bore, a compressor wheel connected to said shaft proximate said inlet port and a turbine wheel connected to said shaft proximate said outlet port; and (d) gaseous fuel supply means in communication with said second turbocompressor for supplying gas under pressure to said second turbocompressor to drive said turbine wheel thereof, whereby said compressor wheel will be controllably driven to compress gas flowing into said second turbocompressor.

15. An apparatus as defined in claim 14 in which said shaft of said second turbocompressor includes:

(a) a plurality of circumferentially spaced, longitudinally extending recesses, each said recess defining an elongated, generally radially outwardly extending step; and (b) a plurality of circumferentially spaced, longitudinally extending grooves disposed proximate said steps, and grooves including an end portion extending beyond one of said longitudinally spaced faces of said support.

16. An apparatus as defined in claim 15 in which said shaft of said first turbocompressor includes:

(a) a plurality of circumferentially spaced, longitudinally extending recesses, each said recess defining an elongated, generally radially outwardly extending step; and (b) a plurality of circumferentially spaced, longitudinally extending grooves disposed proximate said steps, and grooves including an end portion extending beyond one of said longitudinally spaced faces of said support.

17. An apparatus defined in claim 16 in which said gaseous fuel supply means comprises a reservoir of compressed gaseous fuel.

18. An electrical current generating apparatus, comprising:

(a) a fuel cell including:
(i) a housing having first and second chambers and an outlet, said first chamber having an inlet and said second chamber having an inlet; and
(ii) a membrane disposed intermediate said first and second chambers;

(b) a first turbocompressor, operably associated with said fuel cell, including a support housing having an outlet port, an inlet port in communication with said outlet of said fuel cell, a bore defining an inner surface, a shaft rotatable within said bore, a compressor wheel connected to said shaft proximate said inlet port and a turbine wheel connected to said shaft proximate said outlet port, said shaft having:
(i) a plurality of circumferentially spaced, longitudinally extending recesses, each said recess defining an elongated, generally radially outwardly extending step; and
(ii) a plurality of circumferentially spaced, longitudinally extending grooves disposed proximate said steps, and grooves including an end portion extending beyond one of said longitudinally spaced faces of said support;

(c) a second turbocompressor operably associated with said fuel cell, including a support housing having an inlet port in communication with said outlet of said first turbo compressor, an outlet port in communication with said inlet port of said second chamber of said fuel cell, a bore defining an inner surface, a shaft rotatable within said bore, a compressor wheel connected to said shaft proximate said inlet port and a turbine wheel connected to said shaft proximate said outlet port, said shaft having:

(i) a plurality of circumferentially spaced, longitudinally extending recesses, each said recess defining an elongated, generally radially outwardly extending step; and (ii) a plurality of circumferentially spaced, longitudinally extending grooves disposed proximate said steps, and grooves including an end portion extending beyond one of said longitudinally spaced faces of said support; and (d) gaseous fuel supply means in communication with said second turbocompressor for supplying gaseous fuel under pressure to said second turbocompressor to drive said turbine wheel thereof, whereby said compressor wheel will be controllably driven to compress gas flowing into said second turbocompressor.

19. An electrical current generating apparatus, comprising:

(a) a fuel cell including:
(i) a housing having first and second chambers, and an exhaust gas outlet, said first chamber having an inlet and said second chamber having an inlet; and
(ii) a membrane disposed intermediate said first and second chambers;

(b) first drive means connected to said exhaust gas outlet of said housing, and driven by the exhaust gases flowing therefrom, for driving a first gas compressor means;

(c) said first gas compressor means drivably interconnected with said first drive means, for compressing gas derived from atmosphere, said first gas compressor means having an outlet;

(d) a second gas compressor means having an inlet in communication with said outlet of said first gas compressor means for compressing gases derived from said outlet of said first compressor means, said second compressor means having an outlet;

(e) a second drive means also connected to said exhaust gas outlet of said housing and driven by the exhaust gases flowing therefrom, said second drive means being drivably interconnected with said second gas compressor means, said second drive means having a gas outlet;

(f) a third gas compressor means having an inlet in communication with said outlet of said second gas compressor means and an outlet in communication with said first chamber of said housing of said fuel cell;

(g) a third drive means drivably interconnected with said third gas compressor means for driving said third gas compressor means, said third drive means having a gas inlet and a gas outlet in communication with said inlet of said second chamber of said fuel cell;

(h) fuel supply means having an outlet in communication with said inlet of said third drive means for driving said drive means.

20. An apparatus as defined in claim 19 in which said first, second and third drive means comprise first, second and third gas turbines respectively.

21. An apparatus as defined in claim 20 further including first, second and third support means for supporting said first, second and third gas compressor means and said first, second and third gas turbines, respectively, said support means including a gas bearing.

* * * * *